United States Patent
Chen et al.

(10) Patent No.: US 8,885,887 B1
(45) Date of Patent: Nov. 11, 2014

(54) SYSTEM FOR OBJECT DETECTION AND RECOGNITION IN VIDEOS USING STABILIZATION

(71) Applicant: HRL Laboratories, LLC, Malibu, CA (US)

(72) Inventors: Yang Chen, Westlake Village, CA (US); Kyungnam Kim, Oak Park, CA (US); Deepak Khosla, Camarillo, CA (US); Shinko Y. Cheng, Campbell, CA (US)

(73) Assignee: HRL Laboratories, LLC, Malibu, CA (US)

( * ) Notice: Subject to any disclaimer, the term of this patent is extended or adjusted under 35 U.S.C. 154(b) by 107 days.

(21) Appl. No.: 13/748,522

(22) Filed: Jan. 23, 2013

Related U.S. Application Data (60) Provisional application No. 61/589,696, filed on Jan. 23, 2012.

(51) Int. Cl.
   *G06K 9/00* (2006.01)
   *G06T 5/00* (2006.01)

(52) U.S. Cl.
   CPC .................................. *G06T 5/002* (2013.01)
   USPC ........................... 382/103; 348/135; 345/611

(58) Field of Classification Search
   USPC ......... 382/100, 103, 107, 170, 181, 190, 195, 382/254, 275; 348/135, 143, 144, 497; 345/611; 702/69
   See application file for complete search history.

(56) References Cited

U.S. PATENT DOCUMENTS

| | | | |
|---|---|---|---|
| 7,697,725 B2* | 4/2010 | Burns et al. .................. | 382/107 |
| 8,437,558 B1* | 5/2013 | Medasani et al. ............. | 382/225 |
| 2007/0127774 A1* | 6/2007 | Zhang et al. .................. | 382/103 |
| 2007/0183669 A1* | 8/2007 | Owechko et al. ............. | 382/224 |
| 2008/0166015 A1* | 7/2008 | Haering et al. ............... | 382/103 |
| 2009/0063675 A1* | 3/2009 | Faris et al. .................... | 709/224 |
| 2011/0142283 A1 | 6/2011 | Huang et al. | |
| 2013/0342681 A1* | 12/2013 | Duong ......................... | 348/135 |

OTHER PUBLICATIONS

Laurent Itti, Christof Koch, and Ernst Niebur, A Model of Saliency-Based Visual Attention for Rapid Scene Analysis, IEEE Transactions on Pattern Analysis and Machine Intelligence, vol. 20, No. 11, Nov. 1998. pp. 1254-1259.

David G. Lowe, "Object recognition from local scale-invariant features," International Conference on Computer Vision, Corfu, Greece (Sep. 1999), pp. 1150-1157.

(Continued)

*Primary Examiner* — Anand Bhatnagar
(74) *Attorney, Agent, or Firm* — Tope-McKay & Associates

(57) ABSTRACT

Described is a system for stabilizing, detecting, and recognizing objects in video captured from a mobile platform. The system first receives a video (with a plurality of image frames) captured from a mobile platform. The video is stabilized by registering the image frames to a global coordinate system to generate stabilized image frames. A bio-inspired attention algorithm is applied to the stabilized image frames to produce a set of locations in the stabilized image frames that are salient points representative of an object of interest. An image chip is generated that surrounds each salient point. High-dimensional feature vectors are extracted from the image chip. The feature vectors are then classified as an object class. Thus, through classifying the feature vectors, an object of interest can be identified in the video as captured from the mobile platform.

21 Claims, 6 Drawing Sheets

(56) References Cited

OTHER PUBLICATIONS

D. Koller, J. Weber, T. Huang, J. Malik, G. Ogasawara, B. Rao, and S. Russel, "Towards Robust Automatic Traffic Scene Analysis in Real-Time" In Proceedings of Int'l Conference on Pattern Recognition, 1994, pp. 126-131.

Sudipta N. Sinha, Jan-Michael Frahm, Marc Pollefeys, and Yakup Genc, "GPU-Based Video Feature Tracking and Matching", EDGE 2006, workshop on Edge Computing Using New Commodity Architectures. Chapel Hill, May 2006.

Martin A. Fischler and Robert C. Bolles (Jun. 1981). "Random Sample Consensus: A Paradigm for Model Fitting with Applications to Image Analysis and Automated Cartography". Comm. of the ACM 24 (6): 381-395.

Z. Yin and R. Collins, "Moving Object Localization in Thermal Imagery by Forward-Backward Motion History Images," Book chapter in Augmented Vision Perception in infrared, by Riad I. Hammond (Ed.), Springer-Verlag, Adv. Pattern Recognition Series, 2009, ISBN: 978-1-84800-276-0.

Ondfej Chum, Jil Matas, Josef Kittler, "Locally Optimized RANSAC", Pattern Recognition (2003), pp. 236-243.

Z. Yin and R. Collins, "Moving Obiect Locatization in Thermal Imagery by Forward-backward MHI," CVPR Workshop on Object Tracking and Classification in and Beyond the Visible Spectrum (OTCBVS), New York City, NY, Jun. 2008.

Anubhav Agarwal, C. V. Jawahar, P. J. Narayanan, "A Survey of Planar Homography Estimation Techniques", Technical Reports, International Institute of Technology. 2005.

Land, M F; Fernald, R D, "The Evolution of Eyes", Annual Review of Neuroscience 15: 1-29 (1992) by Land and Fernand.

Cucchiara, C. Grana, M. Piccardi, and A. Prati, "Detecting moving objects, ghosts an shadows in video streams", IEEE Trans. on Patt, Anal, and Machine Intell., vol. 25, No. 10, Oct. 2003, pp. 1337-1342.

D. Koller J. Weber, T. Huang, J. Malik, G. Ogasawara, B. Rao, and S. Russel, "Towards Robust Automatic Traffic Scene Analysis in Real-Time," in Proceedings of Int'l Conference on Pattern Recognition, 1994, pp. 126-131.

Sudipta N. Sinha, Jan-Michael Frahm, Marc Pollefeys, and Yakup Genc, "GPU Based Video Feature Tracking and Matching", EDGE 2006, workshop on Edge Computing Using New Commodity Architectures, Chapel Hill, May 2006.

Lowe, David G. (1999). "Object recognition from local scale-invariant features". Proceedings of the international Conference on Computer Vision. 2. pp. 1150-1157.

Herbert Bay, Andreas Ess. Tinne Tuytelaars, Luc Van Gool, "SURF: Speeded Up Robust Features", Computer Vision and Image Understanding (CVIU), vol. 110, No. 3, pp. 346-359, 2008.

Martin A. Fischler and Robert C. Bolles (Jun. 1981). "Random Sample Consensus: A Paradigm for Model Fitting with Applications to Image Analysis and Automated Cartography" Comm. of the ACM 24 (6): 381-395.

Z. Yin and R. Collins, "Moving Object Localization in Thermal Imagery by Forward-Backward Motion History Images," Book chapter in Augmented Vision Perception in infrared, by Riad I, Hammoud (Ed.), Springer-Verlag, Adv. Pattern Recognition Series, 2009. ISBN: 978-1-84800-276-0.

Subhabrata Bhattacharya, Haroon Idrees, Imran Saleemi, Saad Ali, and Mubarak Shah, "Moving Object Detection and Tracking in infrared Aerial imagery", Machine Vision Beyond Visible Specturm, Augmented Vision and Reality, vol. 1, 2011 Springer series, DOI: 10.1007/978-3-642-11568-4.

Ondfej Chum, Jil Matas, Josef Kittler, "Locally Optimized RANSAC", Pattern Recognition (2003), pp. 236-243.

Z. Yin and R. Collins, "Moving Object Localization in Thermal Imagery by Foward-backward MHI," CVPR Workshop on Object Tracking and Classification in and Beyond the Visible Spectrum (OTCBVS), New York City, NY, Jun. 2006.

Saad Ali and Mubarak Shah, COCOA—Tracking in Aerial Imagery, SPIE Airborne Intelligence, Surveillance, Reconnaissance (ISR) Systems and Applications, Orlando, 2006.

Jiangjian Xiao, Hui Cheng, Feng Han, Harpreet S. Sawhney: Geospatial aerial video processing for scene understanding and object tracking. CVPR 2008.

Anubhav Agarwal, C.V. Jawahar, P.J. Narayanan, "A Survey of Planar Homography Estimation Techniques", Technical Reports, International Institute of Informational Technology. 2005.

Laurent Itti, Christof Koch, and Ernst Niebur, A Model of Satiency-Based Visual Attention for Rapid Scene Analysis, IEEE Transactions on Pattern Analysis and Machine Intelligence, vol. 20, No. 11, Nov. 1998. pp. 1254-59.

Serre, T. and Poggio, T. , "A Neuromorphic Approach to Computer Vision", Communiation of the ACM (online), vol. 53, No. 10, Oct. 2010.

Mulch, J. and Lowe, D., "Multiclass Object Recognition with Sparse, Localized Features," Proc. of IEEE Conf. on Computer Vision and Pattern Recognition, Jun. 17-22, 2006, pp. 11-18.

David G. Lowe, "Object recognition from local scale-invarient features," International Conference on Computer Vision, Corfu, Greece (Sep. 1999), pp. 1150-1157.

Richard Hartley and Andrew Zisserman "Multiple View Geometry in Computer Vision," Second Edition, : Cambridge University Press. Mar. 2004. Section 4.7.1, pp. 117-121.

Vladimir N. Vapnik and Corinna Cortes in "Support-Vector Networks", Machin Learning, 20, 1995.

\* cited by examiner

SYSTEM FOR OBJECT DETECTION AND RECOGNITION IN VIDEOS USING STABILIZATION

GOVERNMENT RIGHTS

This invention was made with government support under U.S. Government Contract Number HR0011-10-C-0033 (the DARPA NeoVision2 Program). The government has certain rights in the invention.

CROSS-REFERENCE TO RELATED APPLICATIONS

This is a non-provisional application of U.S. Patent Application No. 61/589,696, filed on Jan. 23, 2012, entitled, "A Method for Video Stabilization and A System for Object Detection and Recognition in Videos Using Stabilization."

FIELD OF INVENTION

The present invention relates to an object detection and recognition system and, more particularly, to an object detection and recognition system using video stabilization to reduce and/or eliminate apparent image motion due to platform motion.

BACKGROUND OF INVENTION

Object/target recognition in aerial videos has been a problem in machine vision research for many years. A traditional approach to object recognition in aerial videos involves detecting the moving targets, tracking them, and then applying a recognition algorithm on the target image ROI (region of interest). This approach suffers from the fact that only moving, targets can be detected and recognized. Furthermore, target detection can be overwhelmed by clutters caused by apparent motion due to platform movement.

As noted above, most researchers follow the traditional paradigm of detection-tracking-recognition. In a separate art, bio-inspired attention and recognition algorithms are a new breed of algorithms that have attracted significant attention in recent years due to their simplicity and performance. However, application of this approach has not been demonstrated before for aerial video target detection/recognition due to the immaturity of the algorithms. Further, such systems do not inherently account for platform motion which is an important factor in aerial videos.

Thus, a continuing need exists for an aerial video target detection system that employs bio-inspired algorithms and that is capable of handling the apparent motion due to platform movement.

SUMMARY OF INVENTION

The present invention relates to a system for stabilizing, detecting, and recognizing objects in video captured from a mobile platform to reduce and/or eliminate apparent image motion due to platform motion. In one aspect, the system includes one or more processors and a memory. The memory has instructions encoded thereon such that upon execution of the instructions, the one or more processors perform several operations, such as receiving a video (the video having a plurality of image frames) captured from a mobile platform (e.g., the mobile platform is an airplane, such that the video is an aerial video). The video is then stabilized by registering the image frames to a global coordinate system to generate stabilized image frames. A bio-inspired attention algorithm, is applied to the stabilized image frames to produce a set of locations in the stabilized image frames that are salient points representative of an object of interest. An image chip is then generated that surrounds each salient point. High-dimensional feature vectors are then extracted from the image chip. Finally, the feature vectors are then classified as an object class. Thus, through classifying the feature vectors, an object of interest can be identified in the video as captured front the mobile platform.

In another aspect, stabilizing the video further comprises operations of:
  extracting key points and feature descriptors in the image frames;
  matching key points between two images of the image frames to generate a list of candidate set of matching points from the two images;
  generating a homography transformation between the two images that fits the candidate set of matching points; and
  warping the image frames using the homography transformation to generate the stabilized image frames.

In another aspect, a match for a key point in a first image is defined as the key point in the second image with a minimum Euclidean distance based on descriptor vectors of the key points.

In yet another aspect, in warping the image frames, a block size of N frames is selected, in which each frame is warped to the coordinates of a first frame in the block using the homography transformation.

In another aspect, in warping the image frames, each image frame is warped to a previous image frame using the homography transformation.

Finally, the present invention also includes a method and computer program product. The computer program product includes instructions encoded on a non-transitory computer-readable medium, such that upon execution of the instructions, the processor performs the operations listed herein, while the method comprises an act of causing the processor to execute the instructions to perform the listed operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

An embodiment according to the principles of the present invention relates to an object detection and recognition system and, more particularly, to an object detection and recognition system using video stabilization to reduce and/or eliminate apparent image motion due to platform motion. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is system for object detection and recognition in videos using video stabilization. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(2) Introduction

Traditional approaches to object recognition in aerial videos involves detecting moving targets, tracking them, and then applying a recognition algorithm on the target image ROI (region of interest). Such traditional approaches suffer from the fact that only moving targets can be detected and recognized. Furthermore, target detection can be overwhelmed by clutters caused by apparent motion due to platform movement.

A bio-inspired attention algorithm (which can detect both moving and stationary objects) and a bio-inspired recognition algorithm can be combined to form a powerful visual recognition engine without going through the traditional detect and track paradigm. However, the attention algorithm is not very effective for aerial videos since there are too many clutters caused by apparent motion in the video (due to platform motion). The present invention solves this problem by employing video stabilization to reduce and/or eliminate the apparent image motion due to platform motion, therefore significantly boosting the attention algorithm's performance in detecting targets of interest.

Thus, the present invention provides a system of ground object detection and recognition in videos taken from aerial platforms. A video preprocessing module first stabilizes the video images. Then, a bio-inspired attention module detects salient regions in the video imagery where objects of interest can potentially be found. A bio-inspired image recognition module is then used to determine whether there is an object of interest in those locations. This is a significant improvement over the prior art in that it combines video stabilization and bio-inspired saliency for object detection and recognition.

(3) Specific Details of the Invention

Described is a system for object recognition in aerial videos using bio-inspired attention and recognition algorithms. The system relies on first applying video stabilization preprocessing to the aerial videos. The preprocessing allows the images of the ground objects to be easily detected as saliency points by the attention algorithm without suffering from motion-induced clutter. A bio-inspired recognition algorithm is then applied to an image chip around the saliency points. Compared with traditional video object recognition approaches, the present invention can be applied to moving target as well as stationary targets since the detection of targets is not entirely dependent on motion-based cues. A system implementing this algorithm has been developed which demonstrated significantly improved performance over the prior art in terms of a recognition rate/false alarm metric (such as receiver operating characteristics, or ROC, curves).

Figure 1:
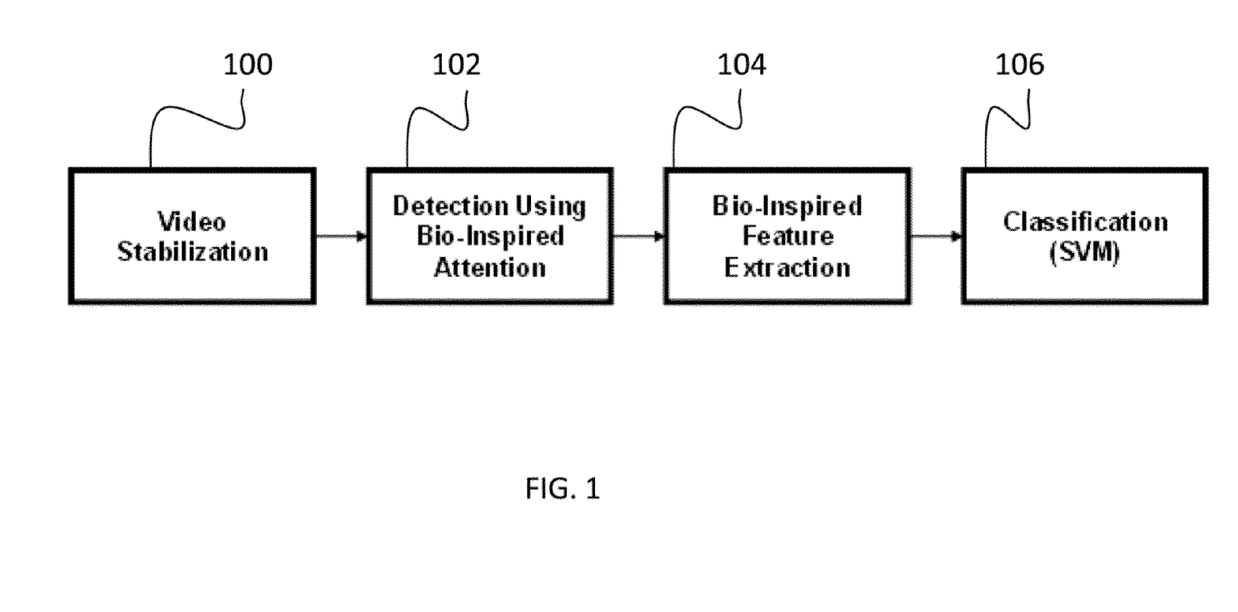
FIG. 1 is a block diagram depicting the architecture for a bio-inspired object recognition system with video stabilization according to the principles of the present invention.

FIG. 1 illustrates the architecture of the system for object recognition in aerial videos. As shown, the system includes a video stabilization module 100 that functions to find the spatial transformation that can be used to warp video images in neighboring frames into a common coordinate system and eliminate the apparent motion due to platform motion. The bio-inspired attention module 102 takes the stabilized video images, applies algorithms based on human visual attention models, and produces a set of locations in the images that are deemed "salient" and are highly likely to contain objects of interest. The bio-inspired feature extraction module 104 takes a small image chip around the salient point from the attention module 102, and extracts high-dimensional feature vectors. Finally, the classification module 106 (such as a Support Vector Machine, SVM, engine) is used to classify the features into different object classes or reject the image chip as being one of the interesting object classes. Further details of each module and its functions are provided below.

(3.1) Video Stabilization

Aerial videos taken from airborne platforms contain image motion due to platform motion and jittering/vibration. In order to detect salient or independently moving ground objects in those videos, the video images need to be stabilized frame-by-frame so that stationary objects remains stationary in the image, and moving objects continue to move in the image at a speed that is proportional to their ground speed. The aerial videos are stabilized by registering image frames to a certain global coordinate system. Once warped into the global coordinate system, videos of the scene appear stable with the ground plane and other environmental structures fixed in the image so that independently moving objects (such as ground vehicles) and dismounts are the only moving objects in the video.

Figure 2:
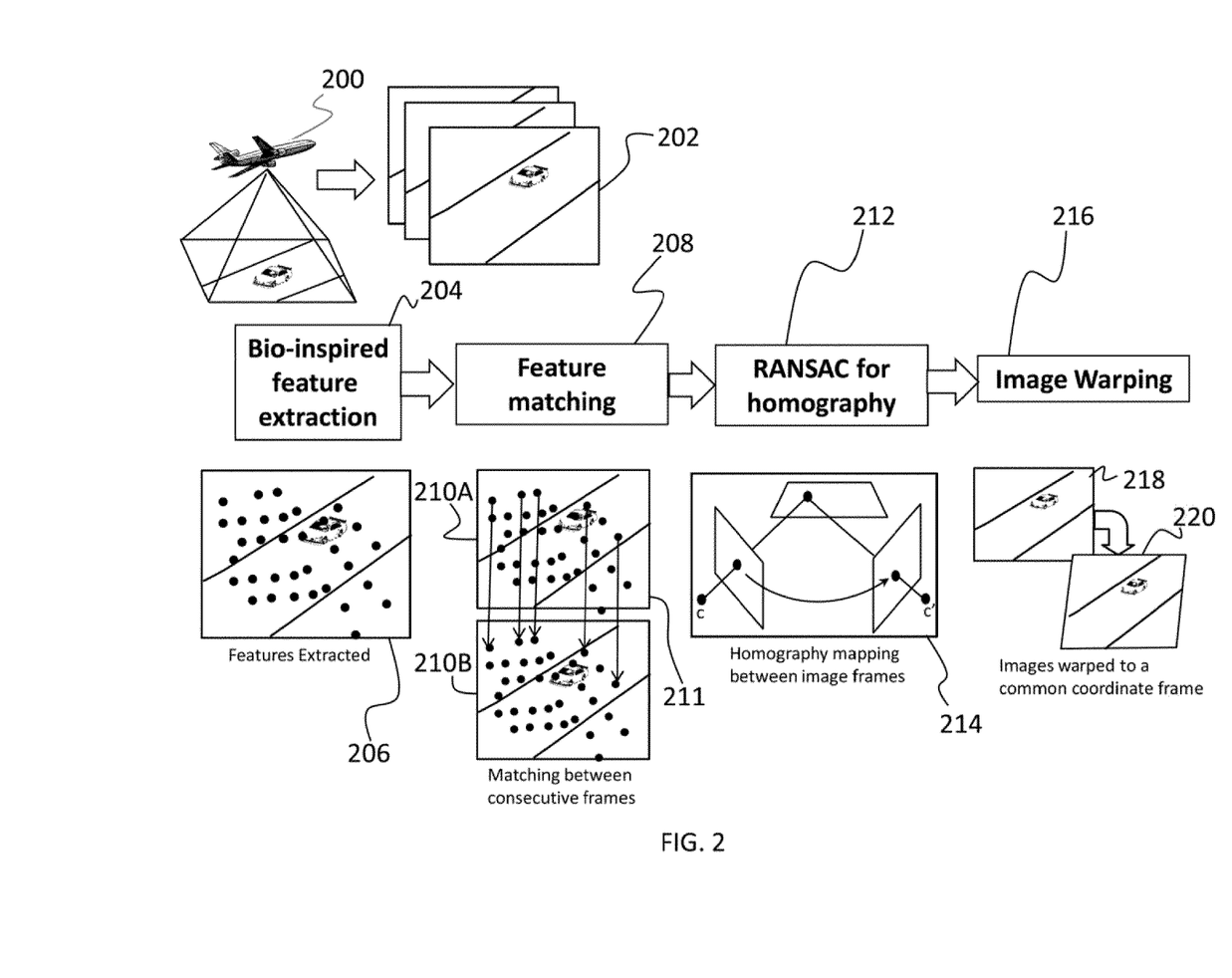
FIG. 2 is a block diagram depicting a process for video stabilization according to the principles of the present invention.

The video stabilization process based on image registration is illustrated in FIG. 2 and described in further detail below. As can be appreciated, prior to stabilizing the video, the system needs to receive a video with a plurality of image frames 202 as captured from a mobile platform 200 (e.g., an airplane). Upon receiving such a video, the stabilization process can be implemented.

The first step is feature extraction 204. In this step, key points and feature descriptors are extracted 206 (which can be used in the subsequent feature matching step). The system can employ any suitable technique for feature extraction, a non-limiting example of which is described as follows. Scale Invariant Feature Transform (SIFT) is used as a feature descriptor which is invariant to scale, orientation, and affine distortions. SIFT was described by David G. Lowe, "Object recognition from local scale-invariant features," International Conference on Computer Vision, Corfu, Greece (September 1999), pp. 1150-1157, which is incorporated by reference as though fully set forth herein. Key points are defined as maxima and minima of the result of difference of Gaussians function applied in scale-space to a series of smoothed and re-sampled images. Dominant orientations are assigned to localized key points. SIFT feature descriptors are 128-D vectors (i.e., descriptor vectors) representing the gradient orientation histograms and can be used to compare if two image key points are similar (i.e., they are from the same point in the scene).

The next step in video stabilization is feature matching 208 between two images 210A and 210B. Feature matching 208 compares the two sets of SIFT features (from each of the two images 210A and 210B) and matches 211 the key points from one image to the other that have similar SIFT features. Feature matching 208 results in a list of candidate set of matching points from the two images that are to be filtered in the next step. There are several techniques to determining the set of matching points. As a non-limiting example, a match for a key point in one image is defined as the key point in the other image with the minimum Euclidean distance based on the descriptor vectors of the key points.

The next step is RANSAC for homography 212. RANSAC is a technique that is well known to those skilled in the art. By way of example, RANSAC is discussed in "Multiple View Geometry in Computer Vision," Second Edition, Richard Hartley and Andrew Zisserman, Cambridge University Press, March 2004, which is incorporated by reference as though fully set forth herein. The list of matching points are not very reliable in that incorrect matches can happen due to noise and inherent inability of a SIFT descriptor in distinguishing certain type of key points. To achieve reliable matching, RANSAC (RANdom Sample Consensus) is applied which is an iterative method to estimate parameters of a mathematical model from a set of observed data that contains outliers. RANSAC is used to find a homography transform (model) 214 that fits the candidate set of matches. As a result, the system provides a set of correct matches as well as an accurate transformation (homography) between the two images.

It should be noted that the homography found between a pair of images can be used to warp one image in the pair to the coordinate frame of the other image so that there is no apparent motion in the images of a static scene except for objects that are moving in the scene. The pair of images can be two consecutive images in the video or they can be several frames apart as long as there is enough overlap in the image of the scene they cover. When the two images are not consecutive images in the video, one can combine the homographies of the pairs of images in between to calculate the total required homography. Thus only the homographies of image pairs of consecutive image frames in a video is required to be calculated using the aforementioned method.

The final step in video stabilization is image warping 216. In other words, the system warps the image frames 218 into a global coordinate frame 220. The image frames 218 are warped using any suitable technique. As a non-limiting example, described below are two operating modes that can be employed for image warping 216 (i.e., a blocked mode and a non-blocked mode). In the blocked mode, a block size of N frames is chosen, in which each frame is warped to the coordinates of the first frame in the block using the homography transformation described above (say, Frames 1, . . . , N are warped into the coordinate system of Frame 1; Frames N+1, . . . , 2N are warped into Frame N+1 and so forth). This way, the images within each block are stabilized with respect to the first frame of the block, while the images between blocks are not stabilized. This approach allows camera panning motion without having to maintain an ever bigger global image frame buffer. To use this mode of operation, the attention algorithm can be set to work in synchronization with the blocks in video images to maximize the detection rate. The block size should be determined by the video frame rate and the aircraft speed and altitude. If the scene does not change much, one can use larger block sizes. Otherwise, the block size should be smaller to ensure proper overlap between the images in a single block. In experiments, stabilized versions of the input aerial videos were produced with a block size of 10, with the videos being taken at 30 fps (altitude=800-1200 meters; speed=40-70 meters/sec).

A second mode of operation is a non-blocked mode. Instead of warping a block of images to a single frame of reference, each image frame in the video is warped to the previous image frame using the corresponding homography transformation, such that the (unwarped) previous image frame and the warped current image frame are sent to the attention algorithm for processing. Therefore, to the attention algorithm, it always processes a pair of images that are "stabilized" with respect to each other.

(3.2) Attention for Object Detection

Following video stabilization, a bio-inspired algorithm of visual attention is used to detect points in the video images where the presence of objects of interest is likely. In other words, the bio-inspired attention algorithm is applied to the stabilized image frames to produce a set of locations in the stabilized image frames that are salient points representative of an object of interest. Any suitable bio-inspired algorithm for visual attention can be used, a non-limiting example of which includes the technique described by Laurent Itti, Christof Koch, and Ernst Niebur, in "A Model of Saliency-Based Visual Attention for Rapid Scene Analysis," IEEE Transactions On Pattern Analysis And Machine Intelligence, Vol. 20, No. 11, November 1998. pp. 1254-59, which is hereby incorporated by reference as though fully set forth herein.

Figure 3:
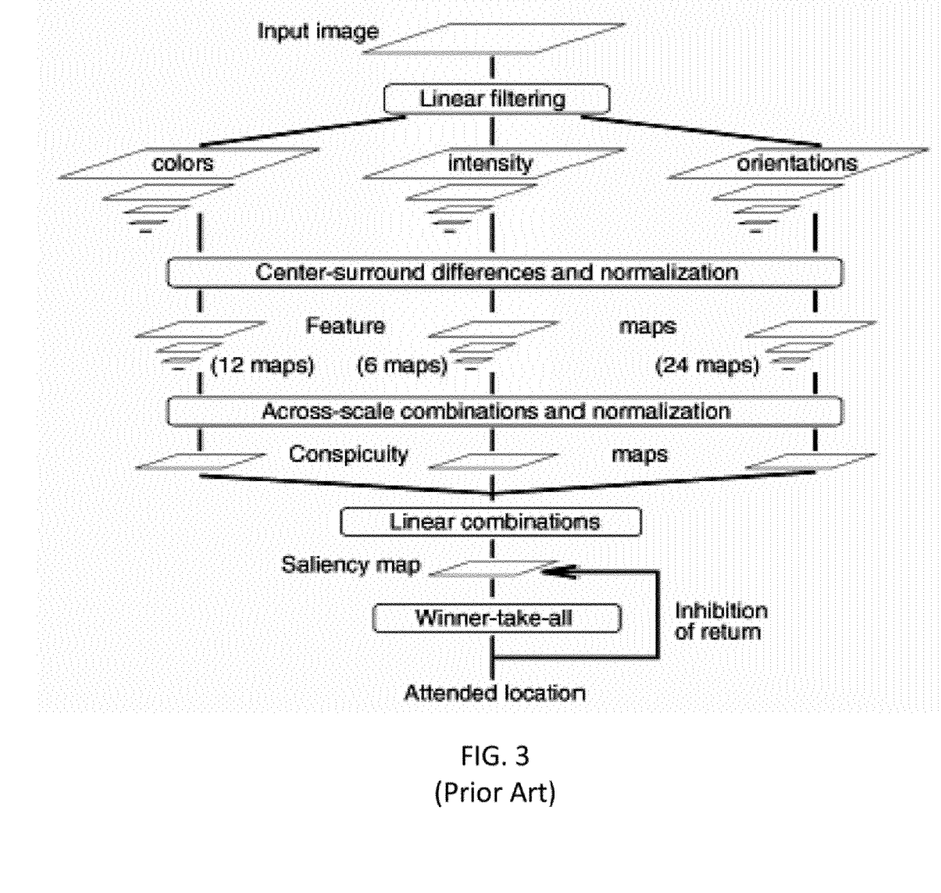
FIG. 3 is a flow chart depicting a bio-inspired model for visual attention.

For further understanding, the attention algorithm is illustrated in FIG. 3. The input to the algorithm is a pair of consecutive image frames (after being stabilized according to the principles of the present invention), and the output is a list of locations in the image that human eyes are likely to attend to given the same image. These "salient" points represent objects in the scene (moving or not), high contrast image features (in color or intensity) or other distinguishing geometric features (such as intersections, etc.). Image chips of any desirable size (such as 128×128 pixels or 256×256 pixels) are then generated that surround each salient point. The image chip size is typically based on an expected size of objects in the image for the particular application. In tests, it was found that chips of either 128×128 pixels or 256×256 pixels were sufficient.

(3.3) Bio-Inspired Feature Extraction for Visual Recognition

Figure 4:
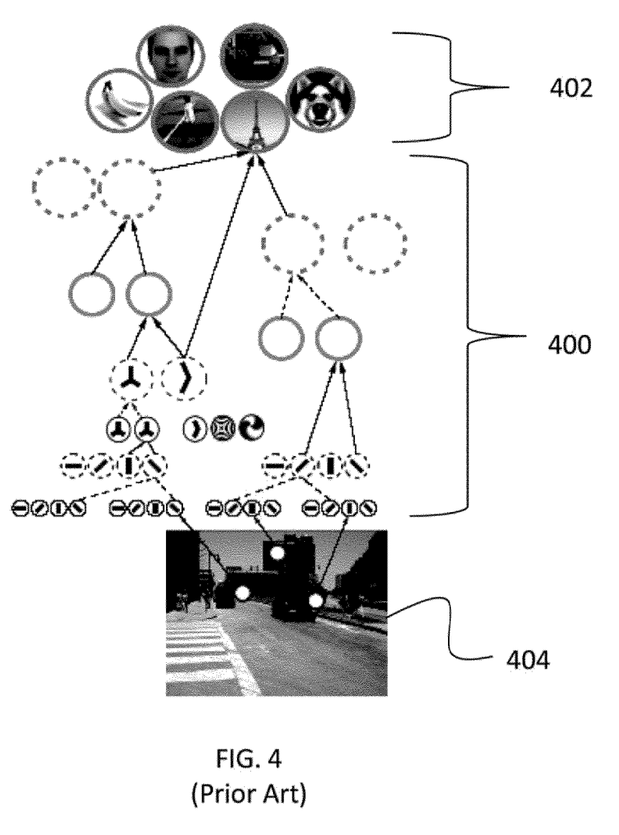
FIG. 4 is an illustration depicting an Hmax/CBCL model of a human visual cortex.

Once the image chips are generated, the bio-inspired feature extraction module is used to extract high-dimensional feature vectors from the image chips. As can be appreciated by one skilled in the art, any suitable feature extraction technique may be employed. As a non-limiting example, Hmax (or CBCL) is a feed-forward model of the mammalian visual cortex (see, for example, Serre, T. and Poggio. T., "A Neuromorphic Approach to Computer Vision", Communications of the ACM (online), Vol. 53, No. 10, October 2010, which is incorporated by reference as though set forth herein) that has been validated to perform similarly as humans do in fast object recognition tasks. As shown in FIG. 4, at the heart of this model is a set of layers of filters 400 simulating simple and complex cells in the mammalian visual cortex. The simple cells perform template matching, and the complex cells perform max-pooling and sub-sampling, which achieves local invariance to shift. As the algorithm moves to higher layers, the features become more invariant with a wider receptive field. At the top layer, this model outputs a vector of high-dimensional features 402 typically ranging in size from hundreds to a few thousand elements that can be used to classify the input image 404 from the bottom layer.

In experiments, the inventors used a model similar to that described by Mutch and Lowe (see, for example, Mutch, J. and Lowe, D., "Multiclass Object Recognition with Sparse, Localized Features," Proc. of IEEE Conf. on Computer Vision and Pattern Recognition, 17-22 Jun. 2006, pp. 11-18, which is incorporated by reference as though set forth herein), but with a base image size of 128×128 pixels and 8 layers of an image pyramid. 200 random C1 patches were used, which were sampled from a set of training images of similar scenes as in the aerial video images. This resulted in a feature vector of 200 dimensions for each input image of 128×128 pixels.

(3.4) Classification

The final step uses the classification module to classify the feature vectors as an object class. Thus, through classifying the feature vectors, an object of interest can be identified in the video as captured from the mobile platform.

As noted above and referring again to FIG. 1, the output from the feature extraction module 104 (e.g., Hmax/CBCL) is a high-dimensional vector (typically hundreds to a few thousand in dimension). A set of labeled training images that includes both objects of interest and background clutter are presented to the Hmax/CBCL model and the resulting feature vectors are used to train a classifier (e.g., support-vector machine (SVM) classifier). Any suitable classifier, such as an SVM classifier, can be used. An SVM classifier is a commonly used classifier that is well known to those skilled in the art. As a non-limiting example, the original SVM algorithm was invented by Vladimir N. Vapnik and the current standard incarnation (soft margin) was proposed by Vapnik and Corinna Cortes in "Support-Vector Networks", Machine Learning, 20, 1995, which is incorporated by reference as though fully set forth herein.

Once trained, the SVM classifier can be operated on-line in the system to provide image classification (such as a vehicle, bike, pedestrian or background) with a confidence value.

As can be appreciated by one skilled in the art, the use of an SVM classifier is of a matter of convenience and performance as SVM has proven to perform well for a variety of classification tasks. However, as noted above, any multi-class classification method that can handle high-dimensional features would be sufficient.

Figure 5:
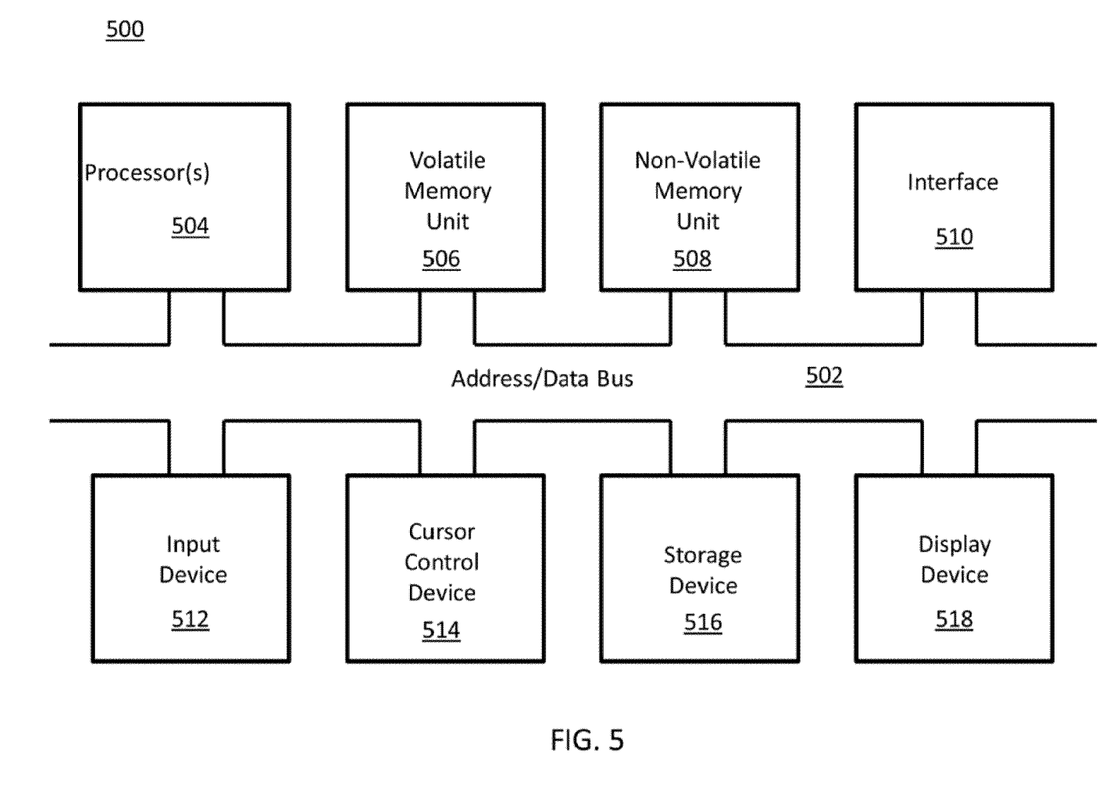
FIG. 5 is a block diagram depicting the components of a system of the principles of the present invention.

A block diagram depicting an example of a system (i.e., computer system 500) of the present invention is provided in FIG. 5. The computer system 500 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 500. When executed, the instructions cause the computer system 500 to perform specific actions and exhibit specific behavior, such as described herein.

The computer system 500 may include an address/data bus 502 that is configured to communicate information. Additionally, one or more data processing units, such as a processor 504 (or processors), are coupled with the address/data bus 502. The processor 504 is configured to process information and instructions. In an aspect, the processor 504 is a microprocessor. Alternatively, the processor 504 may be a different type of processor such as a parallel processor, or a field programmable gate array.

The computer system 500 is configured to utilize one or more data storage units. The computer system 500 may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The computer system 500 further may include a non-volatile memory unit 508 (e.g., read-only memory ("ROM"), programmable ROM ("PROM"), erasable programmable ROM ("EPROM"), electrically erasable programmable ROM "EEPROM"), flash memory, etc.) coupled with the address/data bus 502, wherein the non-volatile memory unit 508 is configured to store static information and instructions for the processor 504. Alternatively, the computer system 500 may execute instructions retrieved from an online data storage unit such as in "Cloud" computing. In an aspect, the computer system 500 also may include one or more interfaces, such as an interface 510, coupled with the address/data bus 502. The one or more interfaces are configured to enable the computer system 500 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 500 may include an input device 512 coupled with the address/data bus 502, wherein the input device 512 is configured to communicate information and command selections to the processor 500. In accordance with one aspect, the input device 512 is an alphanumeric input device, such as a keyboard, that may include alphanumeric and/or function keys. Alternatively, the input device 512 may be an input device other than an alphanumeric input device. In an aspect, the computer system 500 may include a cursor control device 514 coupled with the address/ data bus 502, wherein the cursor control device 514 is configured to communicate user input information and/or command selections to the processor 500. In an aspect, the cursor control device 514 is implemented using a device such as a mouse, a track-ball, a track-pad, an optical tracking device, or a touch screen. The foregoing notwithstanding, in an aspect, the cursor control device 514 is directed and/or activated via input from the input device 512, such as in response to the use of special keys and key sequence commands associated with the input device 512. In an alternative aspect, the cursor control device 514 is configured to be directed or guided by voice commands.

In an aspect, the computer system 500 further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In an aspect, the display device 518 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 500 presented herein is an example computing environment in accordance with an aspect. However, the non-limiting example of the computer system 500 is not strictly limited to being a computer system. For example, an aspect provides that the computer system 500 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 6:
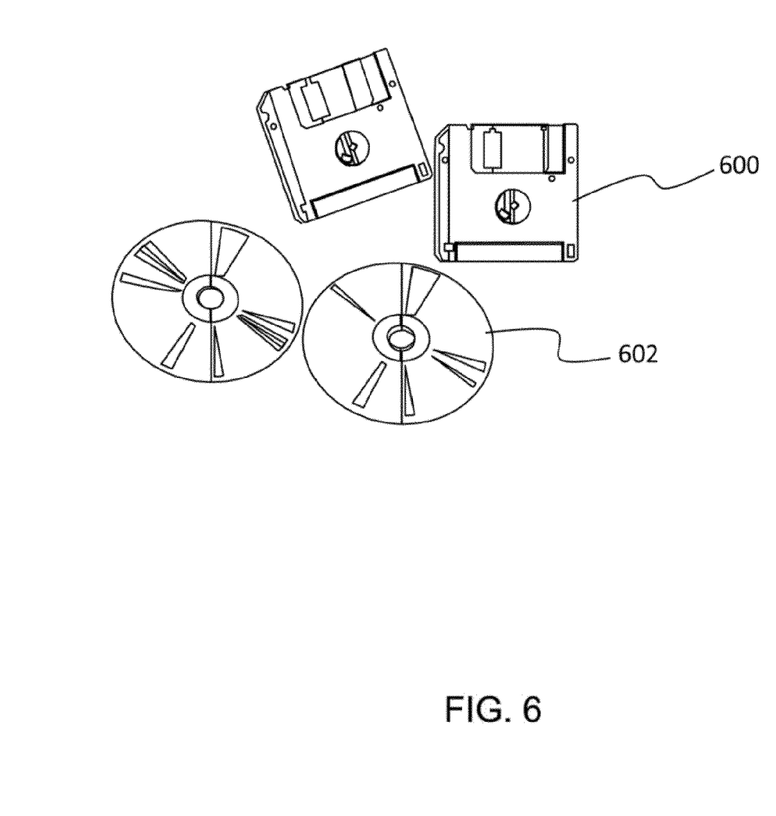
FIG. 6 is an illustration of a computer program product embodying the principles of the present invention.

An illustrative diagram of a computer program product (i.e., storage device) embodying the present invention is depicted in FIG. 6. The computer program product is depicted as floppy disk 600 or an optical disk 602 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instructions" may be stored in the memory of a computer or on a computer-readable medium such as a floppy disk, a CD-ROM, and a flash drive. In either event, the instructions are encoded on a non-transitory computer-readable medium.

What is claimed is:

1. A system for stabilizing, detecting, and recognizing objects in video captured from a mobile platform, comprising:
   one or more processors and a memory, the memory having instructions encoded thereon such that upon execution of the instructions, the one or more processors perform operations of:
   receiving a video captured from a mobile platform, the video having a plurality of image frames;
   stabilizing the video by registering the image frames to a global coordinate system to generate stabilized image frames;
   applying a bio-inspired attention algorithm to the stabilized image frames to produce a set of locations in the stabilized image frames that are salient points representative of an object of interest;
   generating an image chip that surrounds each salient point;
   extracting high-dimensional feature vectors from the image chip; and
   classifying the feature vectors as an object class, whereby through classifying the feature vectors, an object of interest can be identified in the video as captured from the mobile platform.

2. The system as set forth in claim 1, wherein stabilizing the video further comprises operations of:
   extracting key points and feature descriptors in the image frames;
   matching key points between two images of the image frames to generate a list of candidate set of matching points from the two images;
   generating a homography transformation between the two images that fits the candidate set of matching points; and
   warping the image frames using the homography transformation to generate the stabilized image frames.

3. The system as set forth in claim 2, wherein a match for a key point in a first image is defined as the key point in the second image with a minimum Euclidean distance based on descriptor vectors of the key points.

4. The system as set forth in claim 2, wherein in warping the image frames, a block size of N frames is selected, in which each frame is warped to the coordinates of a first frame in the block using the homography transformation.

5. The system as set forth in claim 2, wherein in warping the image frames, each image frame is warped to a previous image frame using the homography transformation.

6. The system as set forth in claim 2, wherein in receiving the video captured from the mobile platform, the mobile platform is an airplane, such that the video is an aerial video.

7. The system as set forth in claim 1, wherein in receiving the video captured from the mobile platform, the mobile platform is an airplane, such that the video is an aerial video.

8. A computer implemented method for stabilizing, detecting, and recognizing objects in video captured from a mobile platform, comprising an act of causing a data processor to execute instructions stored on a non-transitory computer-readable medium such that upon execution, the data processor performs operations of:
   receiving a video captured from a mobile platform, the video having a plurality of image frames;

stabilizing the video by registering the image frames to a global coordinate system to generate stabilized image frames;

applying a bio-inspired attention algorithm to the stabilized image frames to produce a set of locations in the stabilized image frames that are salient points representative of an object of interest;

generating an image chip that surrounds each salient point;

extracting high-dimensional feature vectors from the image chip; and classifying the feature vectors as an object class, whereby through classifying the feature vectors, an object of interest can be identified in the video as captured from the mobile platform.

9. The method as set forth in claim 8, wherein stabilizing the video further comprises operations of:

extracting key points and feature descriptors in the image frames;

matching key points between two images of the image frames to generate a list of candidate set of matching points from the two images;

generating a homography transformation between the two images that fits the candidate set of matching points; and warping the image frames using the homography transformation to generate the stabilized image frames.

10. The method as set forth in claim 9, wherein a match for a key point in a first image is defined as the key point in the second image with a minimum Euclidean distance based on descriptor vectors of the key points.

11. The method as set forth in claim 9, wherein in warping the image frames, a block size of N frames is selected, in which each frame is warped to the coordinates of a first frame in the block using the homography transformation.

12. The method as set forth in claim 9, wherein in warping the image frames, each image frame is warped to a previous image frame using the homography transformation.

13. The method as set forth in claim 9, wherein in receiving the video captured from the mobile platform, the mobile platform is an airplane, such that the video is an aerial video.

14. The method as set forth in claim 8, wherein in receiving the video captured from the mobile platform, the mobile platform is an airplane, such that the video is an aerial video.

15. A computer program product for stabilizing, detecting, and recognizing objects in video captured from a mobile platform, the computer program product comprising computer-readable instructions stored on a non-transitory computer-readable medium that are executable by a computer having a processor for causing the processor to perform operations of:

receiving a video captured from a mobile platform, the video having a plurality of image frames;

stabilizing the video by registering the image frames to a global coordinate system to generate stabilized image frames;

applying a bio-inspired attention algorithm to the stabilized image frames to produce a set of locations in the stabilized image frames that are salient points representative of an object of interest;

generating an image chip that surrounds each salient point;

extracting high-dimensional feature vectors from the image chip; and classifying the feature vectors as an object class, whereby through classifying the feature vectors, an object of interest can be identified in the video as captured from the mobile platform.

16. The computer program product as set forth in claim 15, wherein stabilizing the video further comprises operations of:

extracting key points and feature descriptors in the image frames;

matching key points between two images of the image frames to generate a list of candidate set of matching points from the two images;

generating a homography transformation between the two images that fits the candidate set of matching points; and warping the image frames using the homography transformation to generate the stabilized image frames.

17. The computer program product as set forth in claim 16, wherein a match for a key point in a first image is defined as the key point in the second image with a minimum Euclidean distance based on descriptor vectors of the key points.

18. The computer program product as set forth in claim 16, wherein in warping the image frames, a block size of N frames is selected, in which each frame is warped to the coordinates of a first frame in the block using the homography transformation.

19. The computer program product as set forth in claim 16, wherein in warping the image frames, each image frame is warped to a previous image frame using the homography transformation.

20. The computer program product as set forth in claim 16, wherein in receiving the video captured from the mobile platform, the mobile platform is an airplane, such that the video is an aerial video.

21. The computer program product as set forth in claim 15, wherein in receiving the video captured from the mobile platform, the mobile platform is an airplane, such that the video is an aerial video.

* * * * *